(12) United States Patent
Lee et al.

(10) Patent No.: US 10,910,620 B2
(45) Date of Patent: *Feb. 2, 2021

(54) PREPARATION METHOD OF SEPARATOR HAVING ORGANIC-INORGANIC COMPOSITE POROUS COATING LAYER, SEPARATOR FORMED THEREFROM, AND ELECTROCHEMICAL DEVICE CONTAINING THE SAME

(71) Applicants: LG CHEM, LTD., Seoul (KR); TORAY INDUSTRIES, INC., Nasushiobara (JP)

(72) Inventors: Joo-Sung Lee, Daejeon (KR); Sun-Mi Jin, Daejeon (KR)

(73) Assignees: LG CHEM, LTD., Seoul (KR); TORAY INDUSTRIES, INC., Tokyo (JP)

( * ) Notice: Subject to any disclaimer, the term of this patent is extended or adjusted under 35 U.S.C. 154(b) by 87 days.

This patent is subject to a terminal disclaimer.

(21) Appl. No.: 16/184,815

(22) Filed: Nov. 8, 2018

(65) Prior Publication Data

US 2019/0081306 A1  Mar. 14, 2019

Related U.S. Application Data

(63) Continuation of application No. 15/021,535, filed as application No. PCT/KR2015/003260 on Apr. 1, 2015, now Pat. No. 10,158,111.

(30) Foreign Application Priority Data

Apr. 1, 2014 (KR) .................. 10-2014-0038729

(51) Int. Cl.
| | | |
|---|---|---|
| H01M 2/16 | (2006.01) | |
| H01M 10/052 | (2010.01) | |
| H01M 2/14 | (2006.01) | |
| C08J 7/04 | (2020.01) | |
| C08J 5/22 | (2006.01) | |
| H01M 10/0525 | (2010.01) | |

(52) U.S. Cl.
CPC ......... *H01M 2/1686* (2013.01); *C08J 5/2231* (2013.01); *C08J 7/04* (2013.01); *H01M 2/145* (2013.01); *H01M 2/166* (2013.01); *H01M 2/1653* (2013.01); *H01M 10/052* (2013.01); *H01M 10/0525* (2013.01); *C08J 2309/06* (2013.01); *C08J 2333/08* (2013.01); *C08J 2409/06* (2013.01); *C08J 2433/08* (2013.01)

(58) Field of Classification Search
CPC .. H01M 2/1686; H01M 2/145; H01M 2/1653; H01M 2/166; C08J 5/2231; C08J 7/04

USPC .................. 429/144, 251; 427/222
See application file for complete search history.

(56) References Cited

U.S. PATENT DOCUMENTS

| | | |
|---|---|---|
| 7,416,608 B2 | 8/2008 | Liu et al. |
| 2002/0015796 A1 | 2/2002 | Tomaru et al. |
| 2008/0292968 A1 | 11/2008 | Lee et al. |
| 2009/0246613 A1 | 10/2009 | Park et al. |
| 2011/0223340 A1 | 9/2011 | Tremel et al. |
| 2011/0229768 A1* | 9/2011 | Pan .............. C08J 5/2287 429/309 |
| 2012/0003524 A1 | 1/2012 | Jo et al. |
| 2012/0094184 A1 | 4/2012 | Abe et al. |
| 2012/0115036 A1 | 5/2012 | Lee et al. |
| 2012/0328929 A1 | 12/2012 | Matsumoto et al. |
| 2013/0244082 A1 | 9/2013 | Lee et al. |
| 2013/0316219 A1 | 11/2013 | Ha et al. |
| 2013/0330590 A1 | 12/2013 | Toyoda |
| 2014/0023921 A1 | 1/2014 | Lee et al. |
| 2015/0056491 A1 | 2/2015 | Zhao et al. |

FOREIGN PATENT DOCUMENTS

| | | |
|---|---|---|
| CN | 103000848 A | 3/2013 |
| CN | 103441230 A | 12/2013 |
| EP | 2677590 A2 | 12/2013 |
| JP | 2006-346516 A | 12/2006 |
| JP | 2009-518809 A1 | 5/2009 |
| JP | 4277465 B2 | 6/2009 |
| JP | 2011-144245 A | 7/2011 |
| KR | 10-0754746 B1 | 9/2007 |
| KR | 10-2013-0075672 A | 7/2013 |
| TW | 201041657 A1 | 12/2010 |
| TW | 201320446 A1 | 5/2013 |
| WO | WO 2012/099149 A1 | 7/2012 |
| WO | WO-2012099149 A1 * | 7/2012 .......... H01M 2/1653 |

OTHER PUBLICATIONS

Higashioji Takuji, Machine Translation of WO 2012/099149 A1, Jul. 2012 (Year: 2012).
International Search Report issued in PCT/KR2015/003260 dated Jul. 30, 2015.
Wakizaka, Yasuhiro, Machine Translation of JP 2011-144245 A, Jul. 2011 (Year: 2011).

* cited by examiner

*Primary Examiner* — Sean P Cullen
(74) *Attorney, Agent, or Firm* — Birch, Stewart, Kolasch & Birch, LLP

(57) ABSTRACT

A preparation method of a separator according to the present disclosure includes preparing an aqueous slurry including inorganic particles, a binder polymer, and an aqueous medium, and coating the aqueous slurry on at least one surface of a porous polymer substrate to form an organic-inorganic composite porous coating layer, wherein capillary number of the aqueous slurry has a range between 0.3 and 65.

15 Claims, No Drawings

PREPARATION METHOD OF SEPARATOR HAVING ORGANIC-INORGANIC COMPOSITE POROUS COATING LAYER, SEPARATOR FORMED THEREFROM, AND ELECTROCHEMICAL DEVICE CONTAINING THE SAME

CROSS-REFERENCE TO RELATED APPLICATIONS

This application is a Continuation of co-pending U.S. application Ser. No. 15/021,535 filed on Mar. 11, 2016, which is a National Stage of PCT/KR2015/003260 filed on Apr. 1, 2015, which claims priority to Korean Application No. 10-2014-0038729 filed on Apr. 1, 2014. The entire contents of all of the above applications are hereby incorporated by reference.

TECHNICAL FIELD

The present disclosure relates to a method of preparing a separator of an electrochemical device such as a lithium secondary battery, a separator formed therefrom, and an electrochemical device comprising the same.

BACKGROUND ART

Recently, there has been growing interest in energy storage technologies. As the application fields of energy storage technologies have been extended to mobile phones, camcorders, laptop computers and even electric cars, efforts have increasingly been made towards the research and development of electrochemical devices. In this aspect, electrochemical devices have attracted the most attention, and among them, the development of rechargeable secondary batteries has been the focus of particular interest. In recent years, extensive research and development for new electrode and battery design is being conducted to improve the capacity density and specific energy of the batteries.

Among currently available secondary batteries, lithium secondary batteries developed in the early 1990's have received a great deal of attention due to their advantages of higher operating voltages and much higher energy densities than traditional batteries using aqueous electrolyte solutions, such as Ni-MH batteries, Ni—Cd batteries and $H_2SO_4$—Pb batteries. However, such lithium ion batteries have disadvantages of safety-related problems caused by the use of organic electrolyte solutions, for example, ignition and explosion, and complex manufacturing. Lithium ion polymer secondary batteries designed to overcome the weak points of lithium ion batteries are stated to be one of the next-generation batteries, but their capacity is still lower than that of lithium ion batteries and a discharge capacity, particularly, at low temperature, is insufficient, and accordingly, there is an urgent demand for improvement.

Such electrochemical devices are produced by many companies, but their safety characteristics show different aspects from each other. Assessing and ensuring the safety of electrochemical devices is very important. One of the most important considerations is that electrochemical devices should not cause damage to users in the event of malfunction, and for this purpose, Safety Standards impose strict regulations on ignition and explosion in electrochemical devices. In the safety characteristics of electrochemical devices, electrochemical devices have a high risk of explosion in the event of overheat or thermal runaway of an electrochemical device or penetration of a separator. Particularly, a polyolefin-based porous polymer substrate commonly used as a separator of an electrochemical device shows serious thermal contraction behaviors at the temperature higher than or equal to 100° C. due to material characteristics and procedural characteristics including stretching, causing a short circuit between a positive electrode (or cathode) and a negative electrode (or anode).

To solve the safety problem of electrochemical devices, a separator with a porous organic-inorganic coating layer formed by coating a mixture of excess inorganic particles and a binder polymer on at least one surface of a porous polymer substrate having plural pores was proposed. The inorganic particles included in the porous organic-inorganic coating layer have good heat resistance, thereby preventing a short circuit between a positive electrode (or cathode) and a negative electrode (or anode) when an electrochemical device is overheated.

Generally, a separator with a porous organic-inorganic coating layer is manufactured through a process which forms an organic-inorganic coating layer on a porous polymer substrate by dip coating. However, due to the use of an organic solvent-based slurry, this manufacturing method has safety hazards in the manufacture of an electrochemical device, and is less environmentally friendly and economically efficient.

As opposed to an organic solvent-based slurry, an aqueous slurry is safe, eco-friendly, and economically efficient, but its high surface tension causes a low wettability problem on a polyolefin-based substrate, limiting the use for separator coating.

DISCLOSURE

Technical Problem

Therefore, an object of the present disclosure is to provide a preparation method of a separator, by which a separator with an organic-inorganic composite porous coating layer is made through a process of coating a slurry on a porous polymer substrate, and in this instance, an aqueous slurry having predetermined properties is used to improve wetting properties on the porous polymer substrate.

Another object of the present disclosure is to provide a separator obtained by the preparation method.

Still another object of the present disclosure is to provide an electrochemical device with the separator.

Technical Solution

To achieve the above objects, the present disclosure provides a preparation method of a separator including preparing an aqueous slurry including inorganic particles, a binder polymer, and an aqueous medium, and coating the aqueous slurry on at least one surface of a porous polymer substrate to form an organic-inorganic composite porous coating layer, wherein capillary number of the aqueous slurry is from 0.3 to 65, the capillary number is determined by the following equation 1:

$$\text{Capillary number}(Ca) = (\mu \times U)/\sigma \quad \text{<Equation 1>}$$

where $\mu$=viscosity (kgf·s/m$^2$), U=coating velocity (m/s), and $\sigma$=surface tension (kgf/m).

According to an embodiment, there is provided a separator obtained by the preparation method.

According to an embodiment, there is provided an electrochemical device including a positive electrode (or cathode), a negative electrode (or anode), and the separator interposed between the positive electrode (or cathode) and the negative electrode (or anode).

According to an exemplary implementation, the electrochemical device may be a lithium secondary battery.

Advantageous Effects

The present disclosure may ensure safety and economical efficiency in the process by providing a preparation method of a separator which forms an organic-inorganic composite coating layer on a surface of a porous polymer substrate using an aqueous slurry, and may improve the safety of an electrochemical device with the separator obtained as above.

MODE FOR CARRYING OUT THE INVENTION

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

A preparation method of a separator according to one embodiment includes preparing an aqueous slurry including inorganic particles, a binder polymer, and an aqueous medium, and coating the aqueous slurry on at least one surface of a porous polymer substrate to form an organic-inorganic composite porous coating layer.

The capillary number of the aqueous slurry may be determined by the following equation 1:

$$\text{Capillary number}(Ca)=(\mu \times U)/\sigma \qquad \text{<Equation 1>}$$

where $\mu$ denotes a viscosity (kgf·s/m$^2$), U denotes a coating velocity (m/s), and $\sigma$ denotes a surface tension (kgf/m).

The capillary number is a factor for determining wettability of the aqueous slurry, and by suitably controlling this, wetting of the aqueous slurry on the porous polymer substrate may be achieved and coating may be facilitated.

The capillary number is determined by the viscosity, the coating velocity and the surface tension of the aqueous slurry, and the viscosity may change based on the solids content and the supply temperature of the aqueous slurry. The coating velocity represents a velocity when coating the aqueous slurry on the substrate, and based on the coating velocity, wetting of the aqueous slurry on the substrate may change. When the surface tension has a low value, wetting is achieved, making it more advantageous for applying the slurry, and this value may be minimized through an additive.

To ensure optimum wettability of the aqueous slurry through the capillary number, the value determined by the above equation 1 may have a range between 0.3 and 65, for example, between 0.5 and 45. Within this range, wetting on the porous polymer substrate with a low surface tension may be achieved and coating may be facilitated.

The viscosity of the aqueous slurry may be adjusted to an optimum range, and in this instance, a thickening agent may be used. The thickening agent is not limited to a particular type if it is a material able to adjust the viscosity of the aqueous slurry, but may include, for example, carboxymethylcellulose, methylcellulose, hydroxymethylcellulose, ethylcellulose, polyvinylalcohol, oxidized starch, phosphorylated starch, casein, and their salts. These exemplary thickening agents be used singularly or in combination at any ratio. When the thickening agent is used, a ratio of the thickening agent to the aqueous slurry is generally 0.1 mass % or more relative to the inorganic matter, preferably 0.5 mass % or more, more preferably 0.6 mass % or more, and an upper limit is generally 5 mass % or less, preferably 3 mass % or less, more preferably 2 mass % or less. When the ratio is less than the range, coating often reduces noticeably. When the ratio is more than the range, the content of the inorganic particles or binder in the slurry is likely to reduce.

The viscosity of the aqueous slurry may change based on the supply temperature, and the viscosity increases with the decreasing temperature and decreases with the increasing temperature. Thus, by selecting an optimum supply temperature, the viscosity of the aqueous slurry may be suitably controlled. The supply temperature range may be, for example, from 10° C. to 50° C.

The viscosity of the aqueous slurry adjusted through the thickening agent may have a range between 0.005 kgf·s/m$^2$ and 0.05 kgf·s/m$^2$, for example, between 0.01 kgf·s/m$^2$ and 0.25 kgf·s/m$^2$.

The coating velocity of the aqueous slurry may be suitably adjusted to a range within which coating of the aqueous slurry on the porous polymer substrate is easily made, that is, a range within which wettability is ensured. The coating velocity may be determined by the mechanical control in the process, for example, a variable such as the velocity or tension of rollers, and may have a range between 10 m/s and 100 m/s, for example, between 30 m/s and 70 m/s. When the coating velocity is out of the range, economical efficiency reduces due to degradation in coating of the aqueous slurry or a prolonged process time.

The surface tension of the aqueous slurry is an important factor for ensuring wettability on the porous polymer substrate with low surface energy, and it is preferred to impart a low surface tension as possible. To do so, introduction of an additive into the aqueous slurry may induce a reduction in surface tension, and the additive may include an emulsifier, to be exact, a hydrophilic surfactant, for example, any least one hydrophilic surfactant selected from the group consisting of polyoxyethylene(10)-hydrogenated castor oil, polyoxyethylene(40)-hydrogenated castor oil, polyoxyethylene(60)-hydrogenated castor oil, siloxane, polysorbate 60, polysorbate 80, and polysorbate 20. The additive may be added at a content of from about 0.1 wt % to about 3.0 wt % for the weight of the aqueous slurry.

The surface tension of the aqueous slurry through the additive may be adjusted to a range between 0.0015 kgf/m and 0.007 kgf/m.

The aqueous medium used in the aqueous slurry may be water, or a mixture of alcohol and water. The alcohol may include, but is not limited to, methanol, ethanol, propanol, isopropanol, butanol, t-butanol, and pentanol.

The porous polymer substrate being coated using the aqueous slurry may be a porous polymer film substrate or a porous polymer non-woven substrate.

As the porous polymer film substrate, as well known, a separator made of a porous polymer film of polyolefin such as polyethylene and polypropylene may be used, and the polyolefin porous polymer film substrate exerts a shut-down function at the temperature, for example, between 80° C. and 130° C. The polyolefin porous polymer film may be made from polyolefin-based polymers including polyethylene such as high density polyethylene, linear low density polyethylene, low density polyethylene, and ultra high molecular weight polyethylene, polypropylene, polybutylene, and polypentene, singularly or in combination. Also, the porous polymer film substrate may be manufactured using various polymers including polyester, as well as polyolefin. Also, the porous polymer film substrate may be formed in a stack structure of at least two film layers, and each film layer may be formed from polymers, for example, polyolefin and polyester as described above, singularly or in combination.

The porous polymer non-woven substrate may be manufactured from fibers using polymers including polyolefin-based polymers as described above or other polymers with higher heat resistance, for example, polyester such as polyethyleneterephthalate (PET). Similarly, the porous polymer non-woven substrate may be manufactured from the fibers, singularly or in combination.

The material or shape of the porous polymer film substrate may be variously selected based on the desired purpose.

There is no particular limitation on the thickness of the porous polymer substrate, but a preferred thickness is in a range of 1 µm to 100 µm, more preferably, 5 µm to 50 µm, and there is no particular limitation on the pore size and porosity of the porous polymer substrate, but the pore size and porosity is preferably from 0.01 µm to 50 µm and from 10% to 95%, respectively.

There is no particular limitation on a method of coating the aqueous slurry on the porous polymer substrate, but it is preferred to use a slot coating method or a dip coating method. The slot coating is a coating method which coats a coating solution supplied through a slot die on a front surface of a substrate, and a thickness of a porous coating layer may be controlled based on a flow rate being supplied from a quantitative pump. The dip coating is a coating method which immerses a substrate in a tank containing a coating solution, and a thickness of a porous coating layer may be controlled based on a concentration of the coating solution and a velocity when taking the substrate from the coating solution tank, and for more accurate coating thickness control, post-metering through a mayer bar after immersion may be performed, and subsequently, drying in an oven is performed to form a porous coating layer on both surfaces of a porous polymer substrate.

In the slurry in which the inorganic particles are dispersed and the binder polymer is dissolved or dispersed in the aqueous solvent, the inorganic particles are not particularly limited if they are electrochemically stable. That is, available inorganic particles of the present disclosure are not limited to a particular type if they do not cause oxidation and/or reduction reactions in an operating voltage range (for example, from 0 to 5V for $Li/Li^+$) of an electrochemical device being applied. In particular, when inorganic particles having a high dielectric constant are used as the inorganic particles, such inorganic particles may contribute to the increase in the degree of dissociation of an electrolyte salt, for example, a lithium salt, in a liquid electrolyte and may improve ionic conductivity of an electrolyte solution.

By the above reasons, preferably the inorganic particles include inorganic particles having a high dielectric constant greater than or equal to 5, preferably, greater than or equal to 10. The inorganic particles having a dielectric constant greater than or equal to 5 include, as a non-limiting example, $BaTiO_3$, $Pb(Zr,Ti)O_3$(PZT), $Pb_{1-x}La_xZr_{1-y}Ti_yO_3$(PLZT, $0<x<1$, $0<y<1$), $Pb(Mg_{1/3}Nb_{2/3})O_3$—$PbTiO_3$(PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, boehmite (γ-AlO(OH)), $TiO_2$, SiC or mixtures thereof.

Also, the inorganic particles may include inorganic particles capable of transporting lithium ions, that is, inorganic particles that contain lithium atoms and have a function of transferring a lithium ion without storing lithium. The inorganic particles capable of transporting lithium ions include, as a non-limiting example, lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$ based glass ($0<x<4$, $0<y<13$) such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ based glass ($Li_xSi_yS_z$, $0<x<3$, $0<y<2$, $0<z<4$) such as $Li_3PO_4$—$Li_2S$—$SiS_2$, $P_2S_5$ based glass ($Li_xP_yS_z$, $0<x<3$, $0<y<3$, $0<z<7$) such as $LiI$—$Li_2S$—$P_2S_5$, or mixtures thereof.

Also, an average grain diameter of the inorganic particles is not particularly limited, but for formation of a porous coating layer with a uniform thickness and a suitable porosity, a range between 0.001 µm and 10 µm is desirable. When the average grain diameter is less than 0.001 µm, dispersibility may deteriorate, and when the average grain diameter is more than 10 µm, the porous coating layer may increase in thickness.

As the binder polymer, polymer having a glass transition temperature ($T_g$) between −200° C. and 200° C. is preferably used, which may improve the mechanical properties of a porous coating layer to be finally formed, such as flexibility and elasticity.

Also, the binder polymer does not indispensably need to have an ion conduction ability, but when polymer having an ion conduction ability is used, performance of an electrochemical device may be further improved. Accordingly, a binder polymer having a high dielectric constant as possible is preferred. Actually, because a degree of dissociation of salts in an electrolyte solution relies on a dielectric constant of an electrolyte solvent, as the dielectric constant of the binder polymer increases, the degree of dissociation of salts in the electrolyte may be improved. The dielectric constant of the binder polymer may be in a range of 1.0 to 100 (measured at frequency of 1 kHz), in particular, preferably, higher than or equal to 10.

The binder polymer may include, as a non-limiting example, styrene-butadiene rubber (SBR)-based polymers and acrylate-based polymers.

A weight ratio of the inorganic particles and the binder polymer is preferably, for example, in a range between 50:50 and 99:1, more preferably between 60:40 and 99:1, much more preferably between 70:30 and 95:5. When a content ratio of the inorganic particles to the binder polymer is less than 50:50, because the polymer content is high, a porous coating layer being formed may reduce in pore size and porosity. When the content of the inorganic particles is higher than 99 parts by weight, a porous coating layer being formed may degrade in peeling resistance because of a low content of the binder polymer.

The binder polymer in an emulsion state may be dispersed in a solvent, and to facilitate the uniform mixing and solvent removal, non-limiting examples of available solvents may include water, methanol, ethanol, isopropyl alcohol, or mixtures thereof.

The slurry in which the inorganic particles are dispersed and the binder polymer is dissolved in the solvent may be prepared by dissolving the binder polymer in the solvent, and adding and dispersing the inorganic particles. The inorganic particles may be added after pulverized to an optimum size, but it is preferred to add the inorganic particles to a solution of the binder polymer, and subsequently disperse the inorganic particles while pulverizing them using a ball mill method.

The organic-inorganic composite porous coating layer produced by the above method may have improvements in wetting on the porous polymer substrate and consequently bondability. In the organic-inorganic composite porous coating layer, when the inorganic particles are packed and come into contact with each other, the inorganic particles are bound to each other by the binder polymer to thereby form interstitial volumes among the inorganic particles, and the interstitial volumes among the inorganic particles become void to form pores.

That is, the binder polymer allows the inorganic particles to be adhered to each other to maintain the bound state of the particles, and for example, the binder polymer connects and holds the inorganic particles. Also, the pores of the organic-inorganic composite porous coating layer are pores formed with the interstitial volumes among the inorganic particles that define voids, and this is a space defined by the inorganic particles substantially in surface contact in the closed packed or densely packed structure of the inorganic particles.

An electrochemical device may be fabricated by laminating a positive electrode (or cathode) and a negative electrode (or anode) with a separator prepared by the above method interposed therebetween. The electrochemical device includes all devices facilitating electrochemical reactions, for example, all types of primary and secondary batteries, fuel cells, solar cells, and capacitors such as supercapacitors. Particularly, among the secondary batteries, lithium secondary batteries including lithium metal secondary batteries, lithium ion secondary batteries, lithium polymer secondary batteries, or lithium ion polymer secondary batteries are desirable.

There is no particular limitation on the electrode to be applied together with the separator of the present disclosure, and the electrode may be produced in a manner of binding an electrode active material to an electrode current collector by a common method known in the art. Of the electrode active material, non-limiting examples of a positive electrode (or cathode) active material include a general positive electrode (or cathode) active material that can be commonly used in a positive electrode (or cathode) of an electrochemical device, particularly preferably, lithiated manganese oxide, lithiated cobalt oxide, lithiated nickel oxide, lithiated iron oxide, or composite oxides thereof. Non-limiting examples of a negative electrode (or anode) active material include a general negative electrode (or anode) active material that can be commonly used in a negative electrode (or anode) of an electrochemical device, in particular, preferably, lithium metals or lithium alloys, and lithium adsorption materials such as carbon, petroleum coke, activated carbon, graphite, and other carbons. A positive electrode (or cathode) current collector is made from a foil, as a non-limiting example, based on aluminum, nickel, or a combination thereof, and a negative electrode (or anode) current collector is made from a foil, as a non-limiting example, based on copper, gold, nickel, copper alloys, or combinations thereof.

The electrolyte solution that may be used in the electrochemical device of the present disclosure may be an electrolyte solution in which a salt is dissolved or dissociated in an organic solvent, the salt having a structure represented by, for example, $A^+B^-$ wherein $A^+$ is an alkali metal cation such as $Li^+$, $Na^+$, $K^+$, or combinations thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or combinations thereof, and the organic solvent including, but not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or mixtures thereof.

The pouring of the electrolyte solution may be performed in any suitable step of a battery manufacturing process based on a manufacturing process and required physical properties of a final product. That is, the pouring of the electrolyte solution may be applied before battery assembling or in the final step of battery assembling.

Hereinafter, the present disclosure will be described in detail through examples to help understanding. The embodiments of the present disclosure, however, may take several other forms, and the scope of the present disclosure should not be construed as being limited to the following examples. The embodiments of the present disclosure are provided to more fully explain the present disclosure to those having ordinary knowledge in the art to which the present disclosure pertains.

EXAMPLE 1

Boehmite (γ-AlO(OH)) (Nabaltec Apyral AOH60) having a particle size of 500 nm as an inorganic matter, styrene-butadiene rubber (SBR) (JSR TRD102A) as a binder polymer, and carboxyl methyl cellulose (CMC) (Daicel Chemical Industry 1220) as a thickening agent were mixed at a ratio of 90:6:4 and dissolved in water at 50° C. for about 3 hours or more, and subsequently the inorganic particles were pulverized and dispersed therein for 12 hours or more using a ball mill method, to prepare an aqueous slurry containing solids of 30% level. To reduce the surface tension of the prepared slurry, an emulsifier (Dow Corning 67 additive) corresponding to 0.1% of the weight of the slurry was added. The viscosity of the prepared slurry was 0.007 kgf·s/m², and the surface tension was 0.0025 kgf/m.

The slurry was coated on a 12 μm thick porous film (SK innovation 512GK) at a velocity of 0.2 m/sec by a slot die method, and solvents included in the slurry were dried while passing the slurry through an oven of the temperature adjusted to 80° C., to make a separator with a porous coating layer having a thickness adjusted to 4 μm. Under the above condition, the capillary number was 0.56. The resulting separator achieved a uniform thickness, allowing for a deviation of 1 μm or less in a widthwise direction.

EXAMPLE 2

A slurry and a separator were produced by performing the same process as Example 1 except a coating velocity was changed to 1.5 m/sec. Under the above condition, the capillary number was 4.2, and the resulting separator achieved a uniform thickness, allowing for a deviation of 1 μm or less in a widthwise direction.

EXAMPLE 3

A slurry and a separator were produced by performing the same process as Example 2 except a slurry composition was changed to 85:10:5. Under the above condition, the capillary number was 24.0, and the resulting separator achieved a uniform thickness, allowing for a deviation of 1 μm or less in a widthwise direction.

COMPARATIVE EXAMPLE 1

A slurry and a separator were produced by performing the same process as Example 1 except an emulsifier was not used. Under the above condition, the capillary number was 0.23. A rivulet phenomenon occurred in a coating process, and as a result, a uniform porous coating layer was not formed over the entire width of a substrate.

What is claimed is:

1. A preparation method of a separator, comprising:
   preparing an aqueous slurry comprising inorganic particles, a binder polymer, and an aqueous medium; and
   coating the aqueous slurry on at least one surface of a polyolefin-based porous polymer film substrate to form an organic-inorganic composite porous coating layer,
   wherein a thickness of the porous polymer film substrate is from 5 μm to 50 μm, a pore size of the porous polymer film substrate is from 0.01 μm to 50 μm and a porosity of the porous polymer film substrate is from 10% to 95%
   wherein capillary number of the aqueous slurry is from 4.2 to 65,
   the capillary number is determined by the following equation 1:

Capillary number(Ca)=$(\mu \times U)/\sigma$, wherein the viscosity $\mu$ is from 0.005 to 0.05 kgf·s/m$^2$,
   wherein the coating velocity U is from 0.2 m/s to 2.0 m/s, and
   wherein the surface tension $\sigma$ is from 0.0015 to 0.005 kgf/m.

2. The preparation method of a separator according to claim 1, wherein the capillary number Ca is from 4.2 to 45.

3. The preparation method of a separator according to claim 1, wherein the aqueous medium is water, or a mixture of alcohol and water.

4. The preparation method of a separator according to claim 1, wherein an additive to reduce surface tension is present in an amount of about 0.1 wt % to about 3.0 wt % of the weight of the aqueous slurry and is at least one surfactant selected from the group consisting of polyoxyethylene(10)-hydrogenated castor oil, polyoxyethylene(40)-hydrogenated castor oil, polyoxyethylene(60)-hydrogenated castor oil, siloxane, polysorbate 60, polysorbate 80, and polysorbate 20.

5. The preparation method of a separator according to claim 1, wherein the polyolefin-based porous polymer film substrate is formed from at least one type of polymer selected from the group consisting of polyethylene, polypropylene, polybutylene, and polypentene.

6. The preparation method of a separator according to claim 1, wherein the forming of the organic-inorganic composite porous coating layer is performed by a slot coating method.

7. The preparation method of a separator according to claim 1, wherein the forming of the organic-inorganic composite porous coating layer is performed by a dip coating method.

8. The preparation method of a separator according to claim 1, wherein a weight ratio of the inorganic particles and the binder polymer is in a range between 50:50 and 99:1.

9. The preparation method of a separator according to claim 1, wherein the binder polymer comprises acrylate-based polymer.

10. The preparation method of a separator according to claim 1, wherein the binder polymer comprises styrene-butadiene rubber (SBR)-based polymer.

11. The preparation method of a separator according to claim 1, wherein the binder polymer comprises at least one of styrene-butadiene rubber (SBR)-based polymer and acrylate-based polymer.

12. The preparation method of a separator according to claim 1, wherein an average grain size of the inorganic particles is from 0.001 μm to 10 μm.

13. The preparation method of a separator according to claim 1, wherein the inorganic particles are inorganic particles selected from the group consisting of inorganic particles having a high dielectric constant greater than or equal to 5, inorganic particles capable of transporting lithium ions, and mixtures thereof.

14. The preparation method of a separator according to claim 13, wherein the inorganic particles having a high dielectric constant greater than or equal to 5 are inorganic particles of any one selected from the group consisting of $BaTiO_3$, $Pb(Zr,Ti)O_3$, $Pb_{1-x}La_xZr_{1-y}Ti_yO_3$, wherein $0<x<1$, $0<y<1$, $Pb(Mg_{1/3}Nb_{2/3})O_3$—$PbTiO_3$, hafnia, $SrTiO_3$, $SnO_2$, $CeO_2$, MgO, NiO, CaO, ZnO, $ZrO_2$, $SiO_2$, $Y_2O_3$, $Al_2O_3$, boehmite, SiC and $TiO_2$, or mixtures thereof.

15. The preparation method of a separator according to claim 13, wherein the inorganic particles capable of transporting lithium ions are inorganic particles of any one selected from the group consisting of lithium phosphate of formula $Li_3PO_4$, lithium titanium phosphate of formula $Li_xTi_y(PO_4)_3$, wherein $0<x<2$, $0<y<3$, lithium aluminum titanium phosphate of formula $Li_xAl_yTi_z(PO_4)_3$, wherein $0<x<2$, $0<y<1$, $0<z<3$, $(LiAlTiP)_xO_y$ based glass, wherein $0<x<4$, $0<y<13$, lithium lanthanum titanate of formula $Li_xLa_yTiO_3$, wherein $0<x<2$, $0<y<3$, lithium germanium thiophosphate of formula $Li_xGe_yP_zS_w$, wherein $0<x<4$, $0<y<1$, $0<z<1$, $0<w<5$, lithium nitride of formula $Li_xN_y$, $0<x<4$, $0<y<2$, $SiS_2$ based glass of formula $Li_xSi_yS_z$, wherein $0<x<3$, $0<y<2$, $0<z<4$, and $P_2S_5$ based glass of formula $Li_xP_yS_z$, wherein $0<x<3$, $0<y<3$, $0<z<7$, or mixtures thereof.

* * * * *